US011951939B2

United States Patent
Ikeda et al.

(10) Patent No.: US 11,951,939 B2
(45) Date of Patent: Apr. 9, 2024

(54) ANTI-THEFT SYSTEM FOR WORKING MACHINE, ANTI-THEFT CONTROL METHOD OF THE WORKING MACHINE, AND THE WORKING MACHINE

(71) Applicant: KUBOTA CORPORATION, Osaka (JP)

(72) Inventors: Ryo Ikeda, Osaka (JP); Keisuke Egashira, Osaka (JP); Ryota Ando, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 216 days.

(21) Appl. No.: 16/896,580

(22) Filed: Jun. 9, 2020

(65) Prior Publication Data

US 2020/0406858 A1 Dec. 31, 2020

(30) Foreign Application Priority Data

Jun. 28, 2019 (JP) .................................. 2019-122526

(51) Int. Cl.
  *B60R 25/04* (2013.01)
  *B60R 25/24* (2013.01)
  *H04W 4/40* (2018.01)

(52) U.S. Cl.
  CPC .............. *B60R 25/04* (2013.01); *B60R 25/24* (2013.01); *H04W 4/40* (2018.02); *B60R 2325/205* (2013.01)

(58) Field of Classification Search
  CPC ... B60R 25/04; B60R 25/24; B60R 2325/205; H04W 4/40

USPC .......................................................... 307/10.2
See application file for complete search history.

(56) References Cited

U.S. PATENT DOCUMENTS

2019/0193681 A1* 6/2019 Ito ........................ B60R 25/246
2021/0237686 A1* 8/2021 Inami .................... G07B 15/00

FOREIGN PATENT DOCUMENTS

| EP | 0704352 | 4/1996 |
| JP | 8-150903 | 6/1996 |
| JP | 10-175512 | 6/1998 |
| JP | 2013069124 | * 4/2013 |

* cited by examiner

*Primary Examiner* — Rexford N Barnie
*Assistant Examiner* — Xuan Ly
(74) *Attorney, Agent, or Firm* — Greenblum & Bernstein, P.L.C.

(57) ABSTRACT

An anti-theft system for a working machine, includes: a start-operation tool to issue an order to start a prime mover; an information obtaining device to obtain first information and second information; and a controller device having: a certification storage to store certification information; a start processor to obtain the order issued by the start-operation tool and to start the prime mover when the first information obtained by the information obtaining device is related to the certification information; and a registration processor to perform a registration process for registering the second information as the certification information. The registration processor allows the registration process before starting of the prime mover, and stops allowing the registration process after the starting of the prime mover.

3 Claims, 7 Drawing Sheets

|  | Certification info. |
|---|---|
| Mobile terminal (terminal info.) | 49-37-252-489 |
| Mobile terminal (terminal info.) | 83-25-100-874 |
| Input certification device | 4578992 |
| ⋮ | ⋮ |

ANTI-THEFT SYSTEM FOR WORKING MACHINE, ANTI-THEFT CONTROL METHOD OF THE WORKING MACHINE, AND THE WORKING MACHINE

CROSS-REFERENCE TO RELATED APPLICATIONS

The present application claims priority under 35 U.S.C. § 119 to Japanese Patent Application No. P2019-122526, filed Jun. 28, 2019. The content of this application is incorporated herein by reference in their entirety.

BACKGROUND OF THE INVENTION

Field of the Invention

The present invention relates to an anti-theft system for a working machine, to an anti-theft control method for the working machine, and to the working machine.

Description of Related Art

A technique disclosed in Japanese Unexamined Patent application Publication No. 2013-69124 is previously known as a technique for performing certification or the like before operating a working machine. The rental management system disclosed in Japanese Unexamined Patent application Publication No. 2013-69124 includes a rental management server, a mobile terminal, a rental management server, and a controller device. When a rental reservation is made, the rental management server transmits, to the working machine, individual information as a reservation key. And, the mobile terminal transmits the individual information to the controller device by wireless communication. In addition, in the rental management system, the controller device includes a checking means for checking the reservation key transmitted from the rental management server with the individual information transmitted from the mobile terminal, and enables the working machine to be controlled when the checking by the checking means is complete and disables the control to the working machine when the checking by the checking means is incomplete.

SUMMARY OF THE INVENTION

An anti-theft system for a working machine, includes: a start-operation tool to issue an order to start a prime mover; an information obtaining device to obtain first information and second information; and a controller device having: a certification storage to store certification information; a start processor to obtain the order issued by the start-operation tool and to start the prime mover when the first information obtained by the information obtaining device is related to the certification information; and a registration processor to perform a registration process for registering the second information as the certification information. The registration processor allows the registration process before starting of the prime mover, and stops allowing the registration process after the starting of the prime mover.

A working machine includes the anti-theft system mentioned above.

An anti-theft control method of a working machine for judging whether to start a prime mover of the working machine based on first information and certification information stored in a certification storage of the working machine when a controller device of the working machine obtains the first information and second information, includes: obtaining an order to start the prime mover from a start-operation tool provided in the working machine; judging whether the first information is related to the certification information; starting the prime mover when the first information is related to the certification information; performing a registration process for registering the second information as the certification information to the certification storage before starting of the prime mover; and stopping the registration process after the starting of the prime mover.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings as appropriate.

First Embodiment

Figure 1:
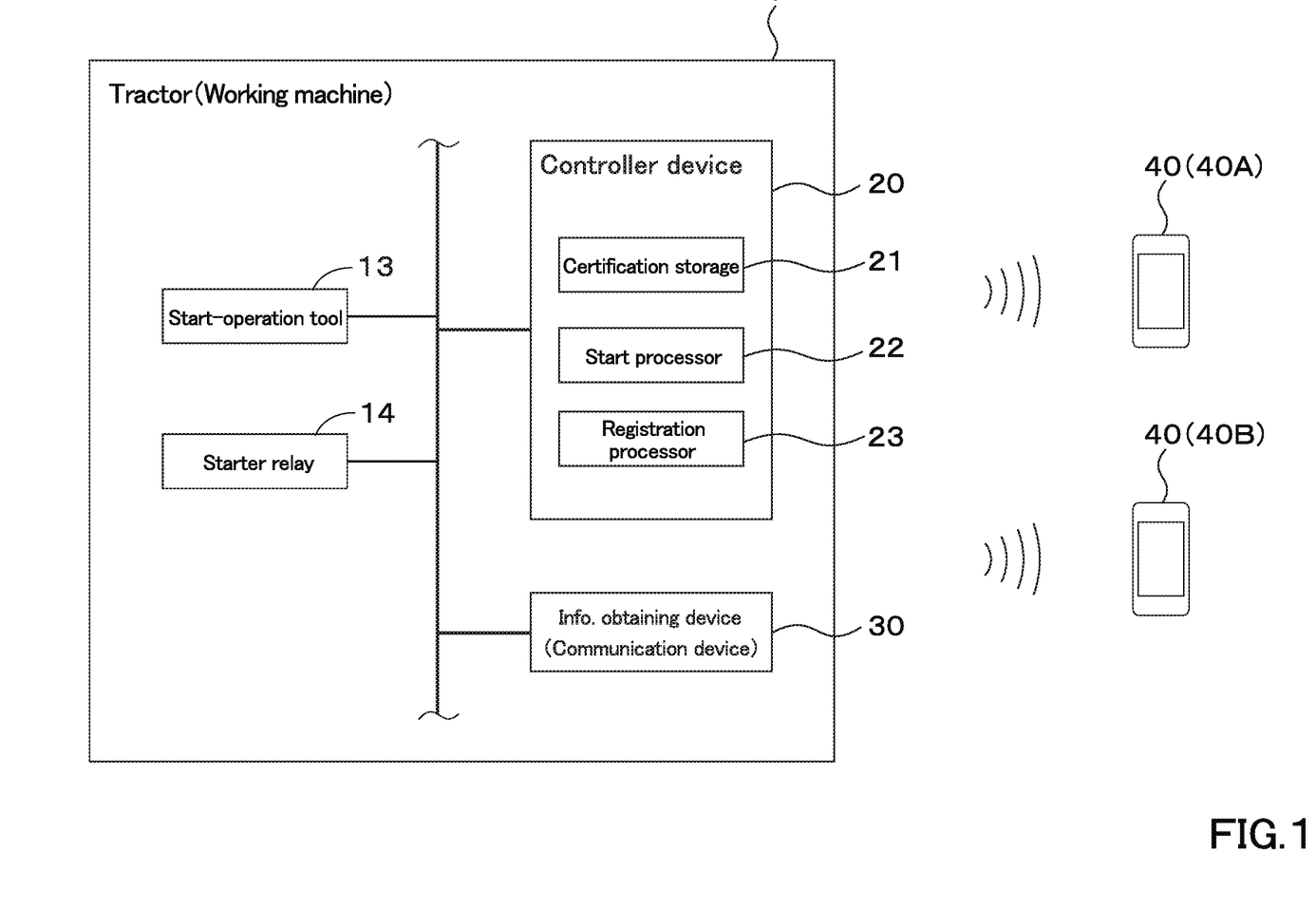
FIG. 1 is a view illustrating a schematic diagram of an anti-theft system for a working machine according to a first embodiment of the present invention.

FIG. 1 shows an overall view of an anti-theft system for a working machine. The working machine is a tractor, a combine, a rice transplanter, a backhoe, a skid steer loader, a compact track loader, or the like. First, the working machine will be described using a tractor 1 as an example.

Figure 6:
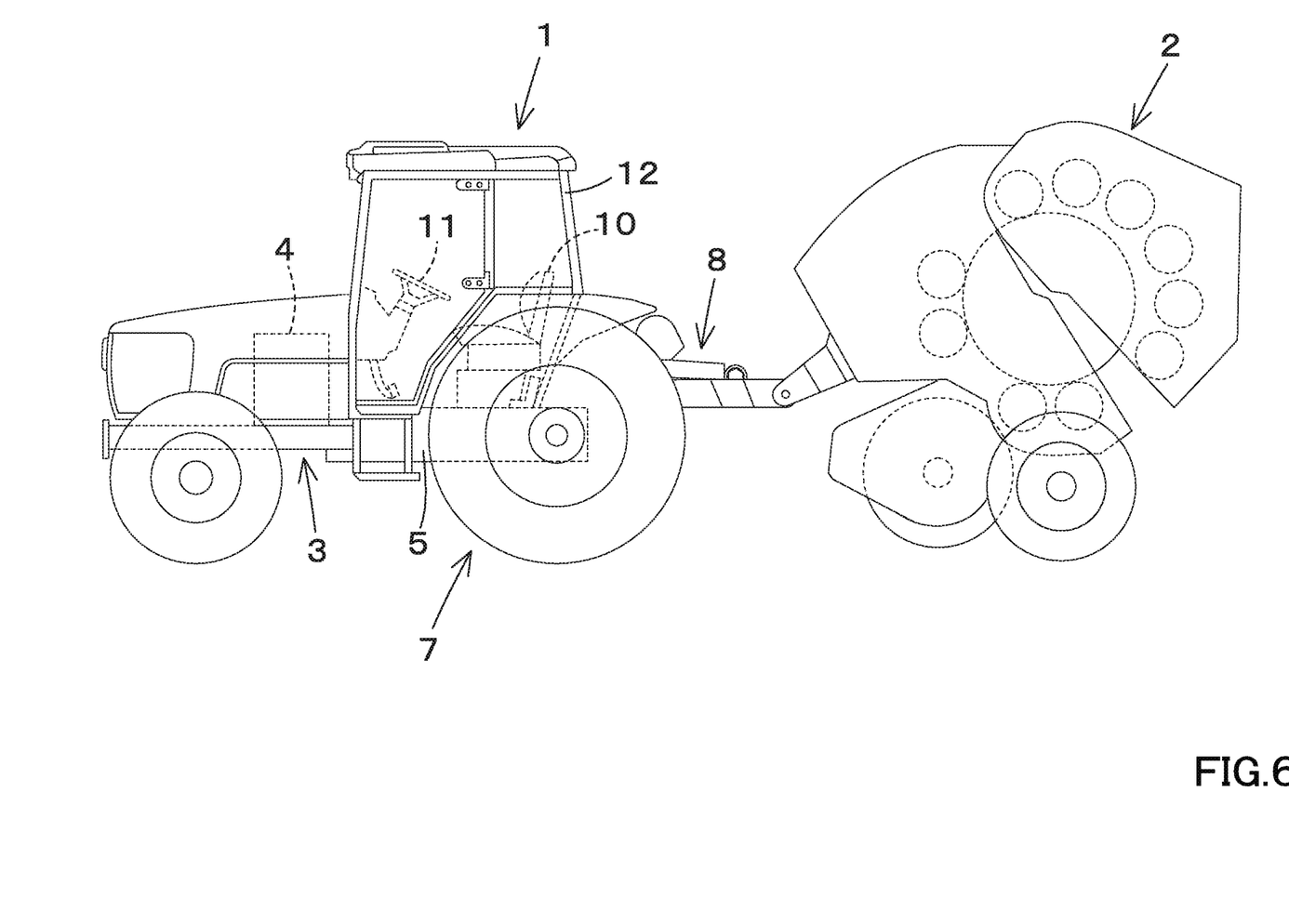
FIG. 6 is a schematic side view of a tractor according to the embodiments.

As shown in FIG. 6, the tractor 1 includes a vehicle (a vehicle body) 3, a prime mover 4, a transmission 5, and a traveling device 7. The prime mover 4 is an internal combustion engine such as a gasoline engine or a diesel engine, an electric motor, or the like.

In the present embodiment, the prime mover 4 is a diesel engine (referred to as an engine). Note that the prime mover 4 may be a hybrid type having an internal combustion engine and an electric motor. The transmission 5 is a device configured to change the propulsion force or the like of the traveling device 7, that is, a device configured to change the speed-shifting gear.

The traveling device 7 is a device having front wheels and rear wheels. The front wheels and the rear wheels may employ a tire type or a crawler type.

In addition, a coupling portion 8 constituted of a three-point link mechanism or the like is provided at a rear portion of the vehicle body 3. A working device 2 is detachable from the coupling portion 8. The working device 2 is coupled to the coupling portion 8, and then the working device 2 can be pulled by the vehicle body 3.

The working device 2 includes a tilling device for performing the tilling, a fertilizer sprayer device for spraying fertilizer, a pesticide sprayer device for spraying pesticides, a harvester device for performing the harvesting, a reaper device for cutting grass and the like, a tedder device for tedding grass and the like, a raking device for raking grass and the like, a bailer device for bailing grass and the like, and the like. FIG. 6 shows an example of attaching the bailer device as the working device 2.

In addition, the tractor 1 includes an operator seat 10 and a driving device 11. The operator seat 10 and the driving device 11 are arranged inside a cabin 12 provided on the vehicle body 3. The driving device 11 is constituted of, for example, a steering wheel, and is configured to change the traveling direction of the tractor 1 when the driving device 11 is steered.

As shown in FIG. 1, the anti-theft system for the working machine includes an information obtaining device. The information obtaining device is a device configured to obtain external information, and is, for example, a communication device 30 provided in the tractor 1. The communication device 30 is, for example, a device configured to obtain information (first information and second information) from at least two mobile terminals 40 (40A and 40B).

The communication device 30 is configured to perform wireless communication with, for example, the Wi-Fi (Wireless Fidelity (a registered trademark)) of the IEEE 802.11 series which is a communication standard, the BLE (Bluetooth Low Energy (a registered trademark)), the LPWA (Low Power, Wide Area), and the LPWAN (Low-Power Wide-Area Network).

The communication device 30 receives the external information including terminal information transmitted from the mobile terminals 40 or the like, and transmits data (information) to the mobile terminals 40 or the like.

The anti-theft system for the working device includes a controller device 20. The controller device 20 is a device that is provided in the tractor 1 and is configured to control the tractor 1. The controller device 20 performs at least a processing for the anti-theft of the tractor 1.

The controller device 20 permits the start of the prime mover 4 when the certification between the external information transmitted from the mobile terminal 40 and the certification information stored in the controller device 20 is established. And, the controller device 20 does not permit the start of the prime mover 4 when the certification is not established.

Next, the driving control of the prime mover 4 by the controller device 20 will be described in detail.

The starting-operation tool 13 and the starter relay 14 are connected to the controller device 20. The starting-operation tool 13 is a switch configured to switch between three positions, and can be switched between ON/OFF/START.

The starting-operation tool 13 is provided in the vicinity of the operator seat 10 and is configured to be operated by an operator. When the starting-operation tool 13 is positioned at the START (a start position), a command for starting the prime mover 4 is issued to the controller device 20. When the starting-operation tool 13 is positioned at the OFF (a stop position), the command for starting the prime mover 4 is not issued to the controller device 20. In addition, when the starting-operation tool 13 is positioned at the ON (an accessory position), a starting power is supplied to the controller device 20 and then the controller device 20 starts the processing (a certification process, and a registration process) and the like.

The starter relay 14 is a switch configured to be switched between ON/OFF. When the starter relay 14 is switched to the ON, the prime mover 4 starts. When the starter relay 14 is switched OFF, the prime mover 4 does not start.

The controller device 20 includes a certification storage portion 21 and a start processor portion 22. The certification storage portion 21 is constituted of a nonvolatile memory or the like, and stores at least the certification information. The certification information is, for example, information necessary for starting the prime mover 4, and includes, for example, a setting code (such as a start permission key) set in the mobile terminal 40, unique information (for example, a MAC address and a serial number) of the mobile terminal 40, a code set by the tractor 1 (such as a start permission key), or the like.

Figure 2:
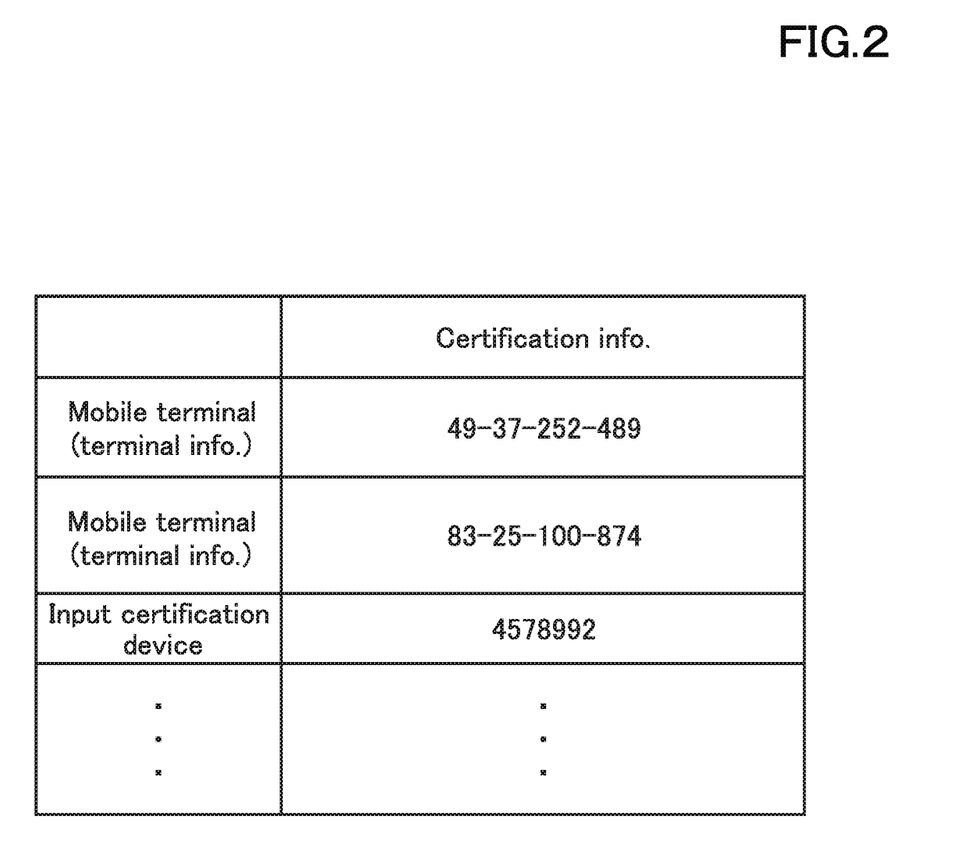
FIG. 2 is a view illustrating an example of certification information according to the first information.

As shown in FIG. 2, the certification storage portion 21 is configured to store plural pieces of the certification information. The certification storage portion 21 is capable of storing, for example, the certification information (first certification information) corresponding to the mobile terminal 40A and the certification information (second certification information) corresponding to the mobile terminal 40B.

In order to store the plural pieces of certification information in the certification storage portion 21, a registration process to be performed by the controller device 20 is required.

The start processor portion 22 is constituted of an electric or electronic component provided in the controller device 20, a computer program stored in the controller device 20, or the like. The start processor portion 22 certificates whether to permit the start of the prime mover 4 and then starts the prime mover 4 when the certification is established.

That is, when the starting-operation tool 13 is positioned at the START (the start position) (when the command for starting is obtained), the start processor portion 22 executes the process for starting.

In the process for starting of the start processor portion 22, the external information transmitted from the mobile terminal 40 to the communication device 30 is compared with the certification information. And, when the state where the external information and the certification information match, that is, when the external information and the certification information are related each other (linked each other), the start processor portion 22 determines that the certification has been established, the starter relay 14 is switched from the OFF to the ON, then the prime mover 4 is started.

For example, when the certification information stored in the certification storage portion 21 is the same as the external information (the setting code, the unique information) transmitted from the mobile terminal 40, the start processor portion 22 determines that the certification has been established, and then the prime mover 4 is started.

On the other hand, in the process for starting of the start processor portion 22, when the state where the external information and the certification information do not match, that is, when the external information and the certification information are not related each other (not linked each other), the start processor portion 22 determines that the certification has not been established, the starter relay 14 is held OFF, thus the prime mover 4 is not started.

The controller device 20 includes a registration processor portion 23. The registration processor portion 23 is constituted of an electric or electronic component provided in the controller device 20, a computer program stored in the controller device 20, or the like.

The registration processor portion 23 performs a registration process for registering, to the certification storage portion 21, the external information transmitted from the mobile terminal 40 as the certification information, that is, for storing the external information. In other words, the registration processor portion 23 performs a process for pairing between the mobile terminal 40 and the tractor 1 (the controller device 20).

The registration processor portion 23 performs the registration process in a period after the controller device 20 is started (the starting-operation tool 13 is positioned to the ON) and before the prime mover 4 starts, and does not perform the registration process after the prime mover 4 starts.

Figure 3A:
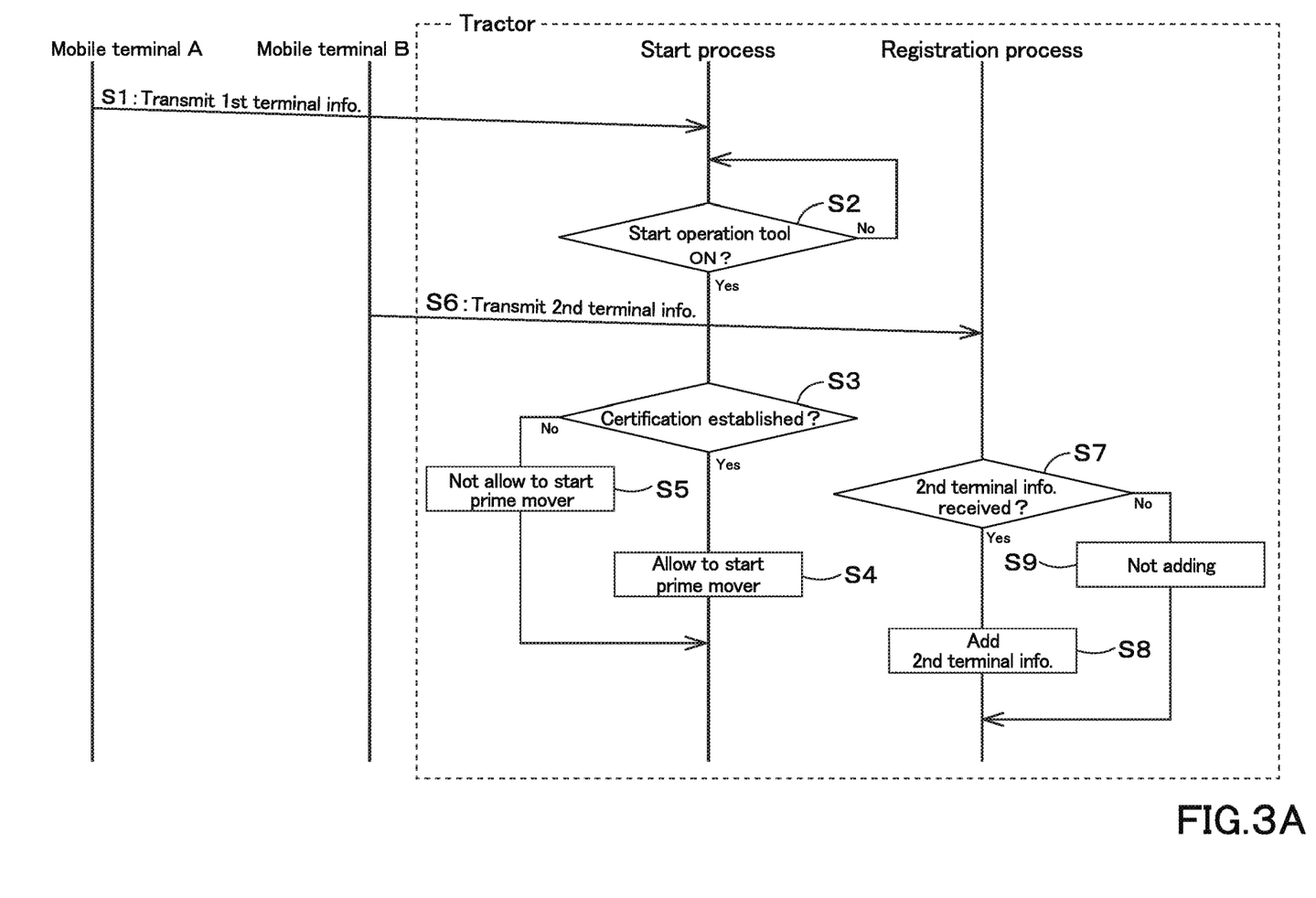
FIG. 3A is a view illustrating flows of a starting process of a prime mover and a registration process according to the first embodiment.

FIG. 3A is a diagram showing a flow of the start-up process of the prime mover 4 and a flow of the registration process, that is, an anti-theft control method of the working machine. The registration processor portion 23 will be described in detail with reference to the FIG. 3A.

For convenience of the explanation, the description will be made assuming that two mobile terminals 40A and 40B transmit the external information (the first information and the second information) to the tractor 1 (the communication device 30). In FIG. 3A, the mobile terminal 40A is represented as a "mobile A", and the mobile terminal 40B is represented as a "mobile B".

In starting the prime mover 4, the mobile terminal 40A transmits, as the first information, first terminal information such as the setting code and the unique information to the communication device 30 (step S1).

When the communication device 30 receives the first terminal information, the start processor portion 22 judges whether or not the command for starting has been obtained, that is, whether or not the starting-operation tool 13 is positioned at the start position (step S2).

When the starting-operation tool 13 is positioned at the starting position (step S2, Yes), the start processor portion 22 judges whether the certification information same as the first terminal information is stored in the certification storage portion 21 (step S3: the certification process).

When the certification information same as the first terminal information is stored in the certification storage portion 21 (step S3, Yes), the start processor portion 22 starts the prime mover 4 (step S4).

When the certification information same as the first terminal information is not stored in the certification storage portion 21 (step S3, No), the start processor portion 22 does not start the prime mover 4 (step S5).

On the other hand, the mobile terminal 40B transmits, as the second information, the second terminal information such as the setting code and the unique information (step S6).

When the communication device 30 receives the second terminal information (step S7, Yes), the registration processor portion 23 adds, as the certification information, the second terminal information to the certification storage portion 21 before the starting-operation tool 13 is switched to the START (the start position), that is, before the prime mover 4 is started (before the processing at step S4 is performed) (step S8).

When the communication device 30 does not receive the second terminal information before the prime mover 4 is started (step S7, No), the registration processor portion 23 does not add, as certification information, the second terminal information to the certification storage portion 21 (step S9).

Figure 3B:
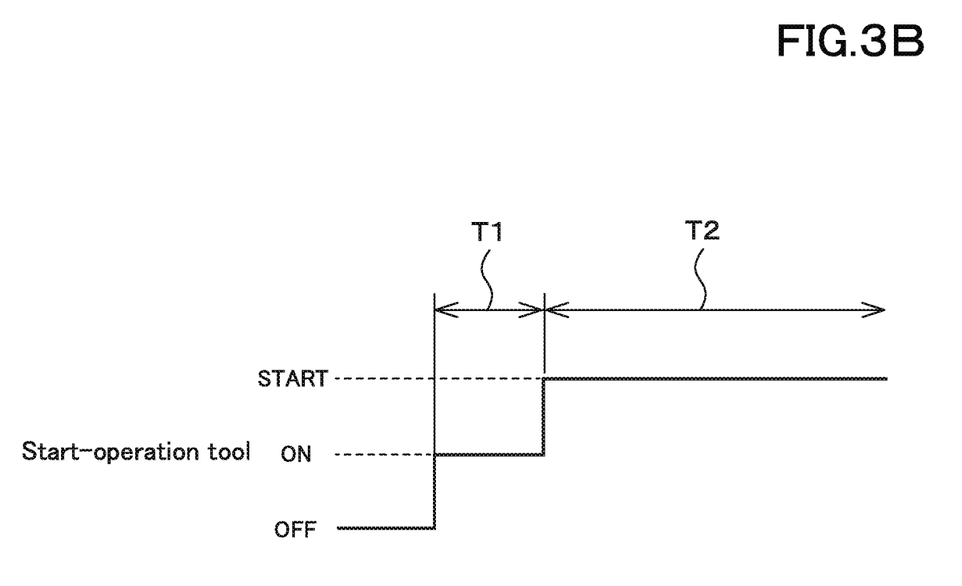
FIG. 3B is a view illustrating a period T1 allowing second terminal information to be registered as certification information according to the first embodiment.

For example, as shown in FIG. 3B, when the communication device 30 receives the second terminal information during the period T1, the registration processor portion 23 stores, as the certification information, the second terminal information already received in the certification storage portion 21. In addition, during a period other than the period T1, especially during the period T2 in which the prime mover 4 is started, even when the communication device 30 receives the second terminal information, the registration processor portion 23 does not add (store) the second terminal information as the certification information.

In the embodiment described above, after the starting-operation tool 13 is positioned to the start position, that is, after the start processor portion 22 obtains a command for starting the prime mover 4, the start processor portion 22 performs the certification process, that is, judges whether the certification storage portion 21 stores the certification information same as that of the first terminal information. However, the start processor portion 22 may perform the certification process before obtaining the command for starting the prime mover 4 and after the start operation tool 43 is positioned to the ON.

Second Embodiment

Figure 4:
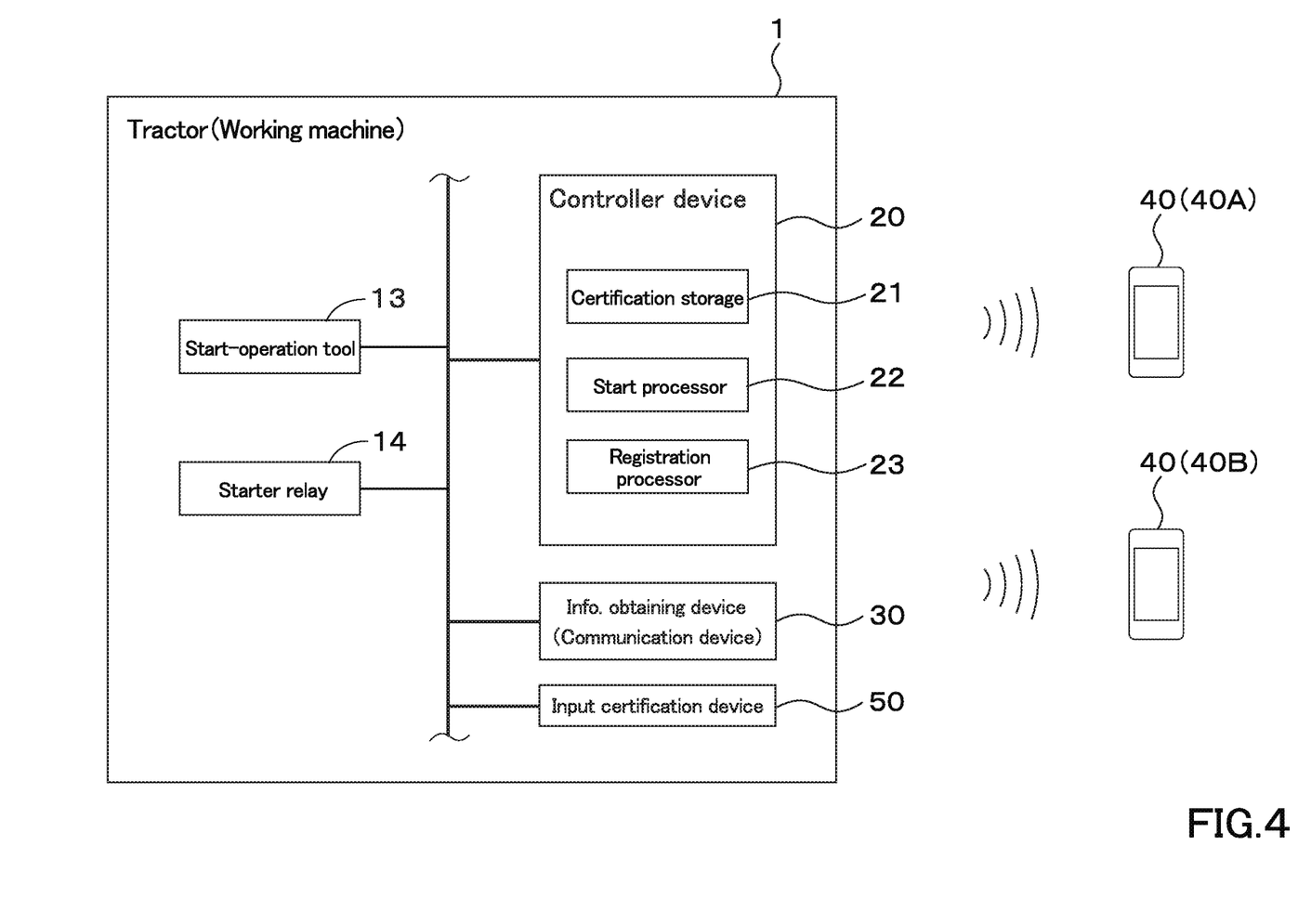
FIG. 4 is a view illustrating a schematic diagram of an anti-theft system for a working machine according to a second embodiment of the present invention.

FIG. 4 shows an anti-theft system for the working machine according to a second embodiment. As shown in FIG. 4, the information obtaining device includes a communication device 30 and an input certification device 50. Since the communication device 30 has the same configuration as that of the communication device according to the first embodiment, the description thereof is omitted.

The input certification device 50 is a device provided around the operator seat 10 of the tractor 1, and is a ten key to which an operator or the like can manually input a numeric number or the like.

Figure 5:
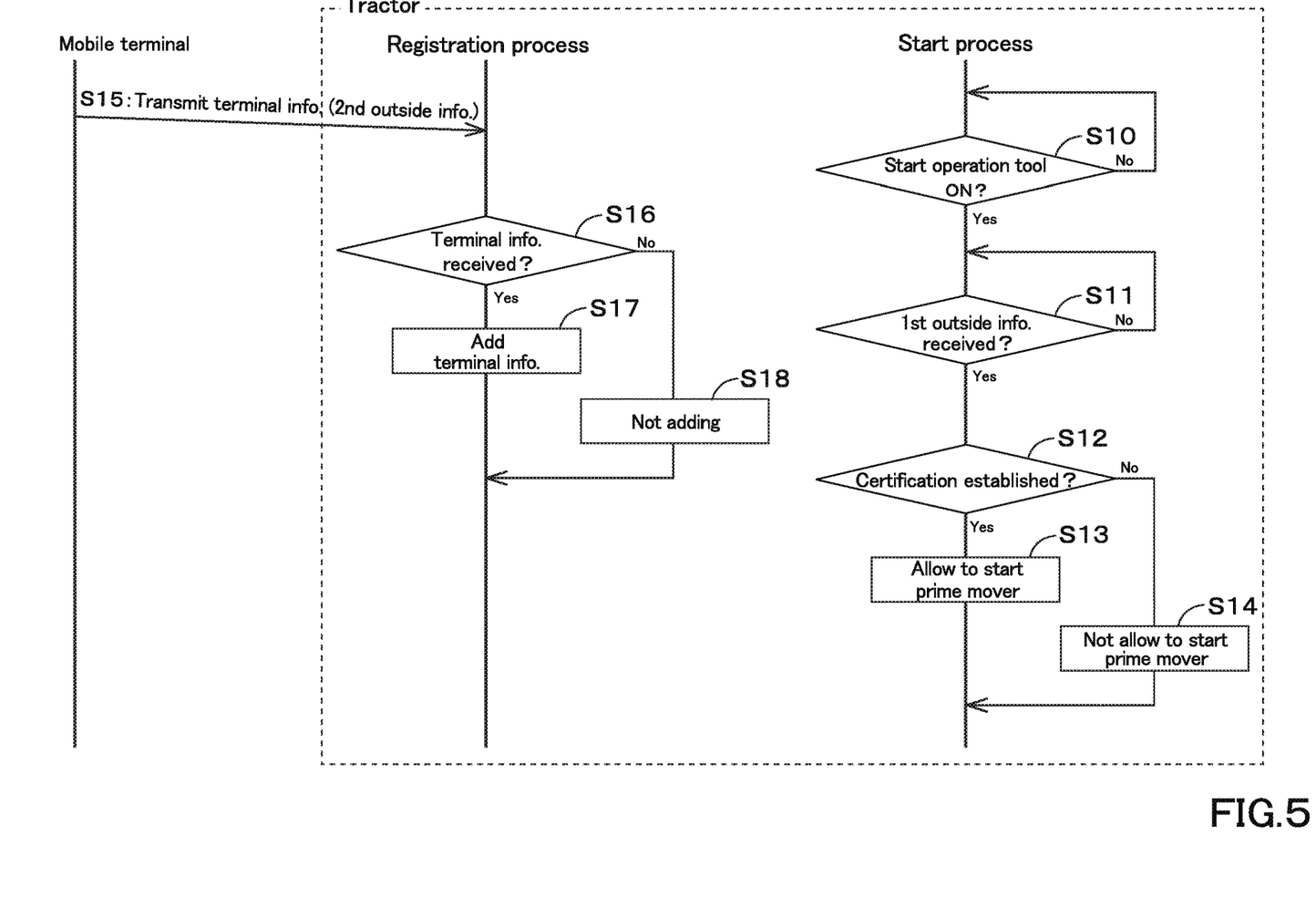
FIG. 5 is a view illustrating flows of a starting process of a prime mover and a registration process according to the second embodiment.

FIG. 5 is a diagram showing a flow of the start-up process of the prime mover 4 and a flow of the registration process (an anti-theft control method of the working machine) according to the second embodiment. The operations of the communication device 30 and the input certification device 50 and the relation between the start-up process and the registration process will be described with reference to FIG. 5.

As shown in FIG. 5, when the starting-operation tool 13 is positioned to the ON (step S10, Yes), the input certification device 50 receives the first information such as a certification code (step S11).

When the first information is input to the input certification device 50 (step S11, Yes), the start processor portion 22 judges whether the certification storage portion 21 stores the same certification information as the first information (step S12: the certification process). When the certification storage portion 21 stores the same certification information as the first information (step S12, Yes), the start processor portion 22 starts the prime mover 4 (step S13).

When the certification storage portion 21 does not store the same certification information as the first terminal information (step S12, No), the start processor portion 22 does not start the prime mover 4 (step S14).

On the other hand, the mobile terminals 40 (40A, 40B) transmit the second information (the terminal information) (step S15).

When the communication device 30 receives the terminal information before the prime mover 4 starts (before the process of S13 is performed) (step S16, Yes), the registration processor portion 23 adds, as the certification information, the second information (the terminal information) to the certification storage portion 21 (step S17).

When the communication device 30 does not receive the second information (the terminal information) after the moving operation tool 13 is positioned to ON before the prime mover 4 starts (before the process of S13 is performed) (step S16, No), the registration processor portion 23 does not add, as the certification information, the second information (the terminal information) to the certification storage portion 21 (step S18).

As shown in FIG. 5, when the certification between the first information and the certification information is not established after the input certification device 50 receives the first information (step S12, No), the registration processor portion 23 may perform a process not to add, as the certification information, the second information (the terminal information) to the certification storage portion 21 even when the second information (the terminal information) is received before the prime mover 4 starts.

That is, under the state where the tractor 1 has received the second information (the terminal information), the registration processor portion 23 may register the second information (the terminal information) as the certification information when the certification between the first information and the certification information is established before the prime mover 4 starts.

The anti-theft system for the working machine 1 includes: the start-operation tool 13 to issue an order to start the prime mover 4; the information obtaining device (the communication device 30) to obtain the first information and the second information; and the controller device 20 having: the certification storage portion 21 to store the certification information; the start processor portion 22 to obtain the order issued by the start-operation tool 13 and to start the prime mover 4 when the first information obtained by the information obtaining device (the communication device 30) is related to the certification information; and the registration processor portion 23 to perform the registration process for registering the second information as the certification information. The registration processor portion 23 allows the registration process before starting of the prime mover 4, and stops allowing the registration process after the starting of the prime mover 4.

The anti-theft control method of the working machine 1 for judging whether to start the prime mover 4 of the working machine 1 based on the first information and the certification information stored in the certification storage portion 21 of the working machine 1 when the controller device 20 of the working machine 1 obtains the first information and the second information, includes: obtaining an order to start the prime mover 4 from the start-operation tool 13 provided in the working machine 1; judging whether the first information is related to the certification information; starting the prime mover 4 when the first information is related to the certification information; performing the registration process for registering the second information as the certification information to the certification storage portion 21 before starting of the prime mover 4; and stopping the registration process after the starting of the prime mover 4.

According to the configuration, the time period during which the registration process for registering the second information as the certification information is allowed ends when the prime mover 4 starts, and thus the registration process is not allowed after the prime mover 4 starts. In this manner, the time period allowing access to the working machine is short, thereby suppressing the unauthorized access. As the result, the theft of the working machine can be further prevented.

The information obtaining device (the communication device 30) is a communication device to receive: the first terminal information that is the first information transmitted from the first mobile terminal; and the second terminal information that is the second information transmitted from the second mobile terminal different from the first mobile terminal. The registration processor portion 23 performs the registration process of the second terminal information serving as the certification information when the first terminal information is related to the certification information stored in the certification storage portion 21, and does not perform the registration process when the first terminal information is not related to the certification information.

According to the configuration, at least when the mobile terminal having the first terminal information related to the certification information is located in the vicinity of the working machine, the second terminal information can be registered as the certification information. That is, when the mobile terminal having the first terminal information related to the certification information is not located in the vicinity of the working machine, the second terminal information cannot be registered as the certification information. In this manner, it is possible to suppress illegally registering the second terminal information as the certification information.

The start processor portion 22 starts the prime mover 4 when the first terminal information is related to the certification information stored in the certification storage portion 21. According to the configuration, the prime mover 4 can be started by the mobile terminal having the first terminal information.

The information obtaining device has: the input certification device 50 to receive inputting of the first information; and the communication device 30 to receive the second information transmitted from the mobile terminal. The registration processor portion 23 performs the registration process when the first information inputted to the input certification device 50 is related to the certification information.

According to the configuration, after the first information related to the certification information is inputted to the input certification device 50, the second information is allowed to be registered as the certification information. The configuration thus prevents the second information from being illegally registered as the certification information.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. An anti-theft system for a working machine, comprising:

a controller having a non-volatile memory configured to store certification information of a plurality of terminals;

a switch configured to switch to an OFF position providing no power to the controller, an ON position providing the power to the controller, and a START position providing, to the controller, a start command for starting a prime mover;

a communicator to receive first terminal information from a first terminal and second terminal information from a second terminal, wherein the controller is configured or programmed, when the communicator receives the first terminal information same as the certification information stored in the memory, to store the second terminal information, in addition to the first terminal information, as the certification information of the second terminal in the memory, which is received by the communicator in a time window after the switch switches from the OFF position to the ON position and before the switch switches from the ON position to the START position, and not to store the second terminal information as the certification information of the second terminal in the memory, which is received by the communicator after the switch switches from the ON position to the START position.

2. The anti-theft system according to claim 1,
wherein the controller is configured or programmed, when the first terminal information is not stored as the certification information in the memory, not to store the second terminal information as the certification information of the second terminal in the memory.

3. The anti-theft system according to claim 1, comprising:
a starter relay to start the prime mover after storing the second terminal information as the certification information of the second terminal in the memory.

* * * * *